(12) United States Patent
Jain et al.

(10) Patent No.: US 10,771,409 B2
(45) Date of Patent: Sep. 8, 2020

(54) REAL-TIME TRIGGER FOR EVENT-BASED ELECTRONIC COMMUNICATION SYSTEM MESSAGING

(71) Applicant: Dropbox, Inc., San Francisco, CA (US)

(72) Inventors: Aditi Jain, San Francisco, CA (US); Manveer Singh Chawla, San Francisco, CA (US); Swapnil Zarekar, Santa Clara, CA (US); Yuanshen Xu, San Francisco, CA (US); Karandeep Johar, San Francisco, CA (US); Gianluca Venturini, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 240 days.

(21) Appl. No.: 15/851,633

(22) Filed: Dec. 21, 2017

(65) Prior Publication Data
US 2019/0199659 A1 Jun. 27, 2019

(51) Int. Cl.
| | |
|---|---|
| *G06F 15/16* | (2006.01) |
| *H04L 12/58* | (2006.01) |
| *H04L 29/08* | (2006.01) |
| *G06F 3/0483* | (2013.01) |

(52) U.S. Cl.
CPC ............ *H04L 51/04* (2013.01); *H04L 51/34* (2013.01); *H04L 67/26* (2013.01); *G06F 3/0483* (2013.01)

(58) Field of Classification Search
CPC .......... H04L 51/04; H04L 51/34; H04L 67/26; G06F 3/0483
See application file for complete search history.

(56) References Cited

U.S. PATENT DOCUMENTS

| | | | | |
|---|---|---|---|---|
| 2008/0228695 | A1* | 9/2008 | Sifry | ................... H04L 67/26 |
| 2009/0240120 | A1* | 9/2009 | Mensinger | ........... A61B 5/7445 600/301 |
| 2009/0320047 | A1* | 12/2009 | Khan | ..................... G06F 9/542 719/318 |
| 2014/0130039 | A1* | 5/2014 | Chaplik | .............. G06F 9/45558 718/1 |
| 2016/0282849 | A1 | 9/2016 | Hollerbach et al. | |
| 2017/0344703 | A1* | 11/2017 | Ansari | ................ H04L 63/0876 |
| 2018/0239959 | A1 | 8/2018 | Bui | |
| 2019/0019197 | A1 | 1/2019 | Roberts | |

OTHER PUBLICATIONS

Jain, U.S. Appl. No. 15/851,630, filed Dec. 21, 2017, Office Action, dated Oct. 4, 2019.

(Continued)

*Primary Examiner* — John B Walsh
(74) *Attorney, Agent, or Firm* — Hickman Palermo Becker Bingham LLP; Adam C. Stone

(57) ABSTRACT

A real-time trigger for event-based electronic communication system messaging. In one embodiment, for example, an event caused by a user's activity or inactivity with respect to an online service is queued. When the event is dequeued, it is transformed to a trigger and the trigger is mapped to an action. The action is dispatched to a messaging track actor to carry out the action. Carrying out the action may include putting a user on a messaging track or transitioning the state of a user already on a messaging track.

19 Claims, 10 Drawing Sheets

(56) References Cited

OTHER PUBLICATIONS

Wikipedia, "URL" https://en.wikipedia.org/wiki/URl, dated Dec. 22, 2017, 4 pages.
Wikipedia, "Text Messaging", https://en.wiki[edia.org/wiki/Text_messaging, dated Dec. 22, 2017, 30 pages.
Wikipedia, "Push Notification", https://en.wikipedia.org/wiki/Push_Notification, dated Dec. 22, 2017, 3 pages.
Wikipedia, "Protocol Buffers" https://en.wikipedia.org/wiki/Protocol_Buffers, dated Dec. 22, 2017, 4 pages.
Wikipedia, "Pop-up Notification" https://en.wikipedia.org/wiki/Pop-up_notification, dated Dec. 22, 2017, 2 pages.
Wikipedia, "JSON", https://en.wikipedia.org/wiki/JSON, dated Dec. 22, 2017, 13 pages.
Wikipedia, "Email", https://enwikipedia.org/wiki/Email, dated Dec. 22, 2017, 17 pages.
Wikipedia, "Apache Kafka", https://en.wikipedia.org/wiki/Apache_Kafka, dated Dec. 22, 2017, 4 pages.

\* cited by examiner

REAL-TIME TRIGGER FOR EVENT-BASED ELECTRONIC COMMUNICATION SYSTEM MESSAGING

TECHNICAL FIELD

The present invention relates to event-based electronic communication systems and, more particularly, to a real-time trigger for such systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Computers and data networks are very powerful tools for performing a wide-variety of tasks. One task that computers and data networks are very useful for is electronic messaging. Typically, electronic messaging involves an electronic communication automatically generated by a computer program and displayed to an intended human recipient on a display screen. The electronic communication may also be interactive. The electronic communication can take a variety of different forms but typically is in the form of a web page, an electronic mail message (i.e., an Email message), a forum post or comment, a text message, an instant message, a push notification, a social network post or comment, or other electronic information that a human can view and potentially interact with using a computer. "Email" is the well-known method of exchanging electronic communications (i.e., Email messages) using a store-and-forward model. More information about Email is available on the Internet at /wiki/Email in the wikipedia.org domain, the entire contents of which is hereby incorporated by reference. A "push notification" is an electronic communication that is "pushed" from a backend server or an application to a user interface such as, for example, the user interface of a portable computing device (e.g., a mobile phone). More information about push notifications is available on the Internet at/wiki/Push_Notification in the wikipedia.org domain, the entire contents of which is hereby incorporated by reference.

The sequence and timing of electronic messaging actions with respect to electronic communications can affect how well the communications are received. For example, assume a user of an online service has already received an Email message prompting the user to try out a new feature of the online service. If the user does not open the Email message within a certain period of time (e.g., within 7 days), then a push notification about the new feature is sent to the user. On the other hand, if the user opens the Email within the time period, then another Email providing more details about the new feature is immediately sent to the user. The sequencing and timing of the additional Email with respect to the original Email can be critically important. For example, if the additional Email is sent to the user without the context of the user having just opened the original Email, then the user might be confused by or uninterested in the details about the new feature in the additional Email. In this case, the additional Email may be "lost" on the user.

Techniques described herein address these issues by providing the real-time trigger for event-based electronic communication system messaging.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques for the real-time trigger for event-based electronic communication system messaging are provided. The techniques provide a real-time way to trigger an "Action" in response to an "Event". For example, an Event might be a user going over a storage quota of an online service and the Action triggered in response to the Event might be starting the user on a Messaging Track or modifying the state of the user that is already on a Messaging Track. An Event, an Action, and a Messaging Track, along with other components of the real-time trigger system, are described in greater detail below.

The techniques may be performed by a computing system comprising one or more processors and storage media storing one or more programs, the one or more programs having instructions executed by the one or more processors to perform the techniques. The techniques may also be embodied in instructions of one or more programs of a computing system, the computing system having storage media storing the one or more programs and one or more processors for executing the instructions. The techniques may further be embodied in instructions of one or more programs stored on one or more non-transitory computer-readable media, the instructions configured for execution by a computing system having one or more processors and storage media. The one or more processors and storage media of a computing system may be provided by one or more computing machines. An example computing machine is described herein with respect to FIG. 7. An example software system for controlling the operation of a computing machine is also described herein with respect to FIG. 8. For example, the techniques may be embodied in one or more application programs 802 and/or one or more operating system 810 instances that execute on one or more computing machines 700. As an alternative to implementing the techniques using software, the techniques may be implemented in hardware or in a combination of hardware and software.

The techniques improve event-based electronic communication systems by providing a real-time way to trigger a messaging Action in response to an Event that is extensible to accommodate new actions and new types of events that trigger actions. The techniques may be used in conjunction with or instead of other techniques for triggering messaging for event-based electronic communication systems.

Real-Time Trigger System

Figure 1:
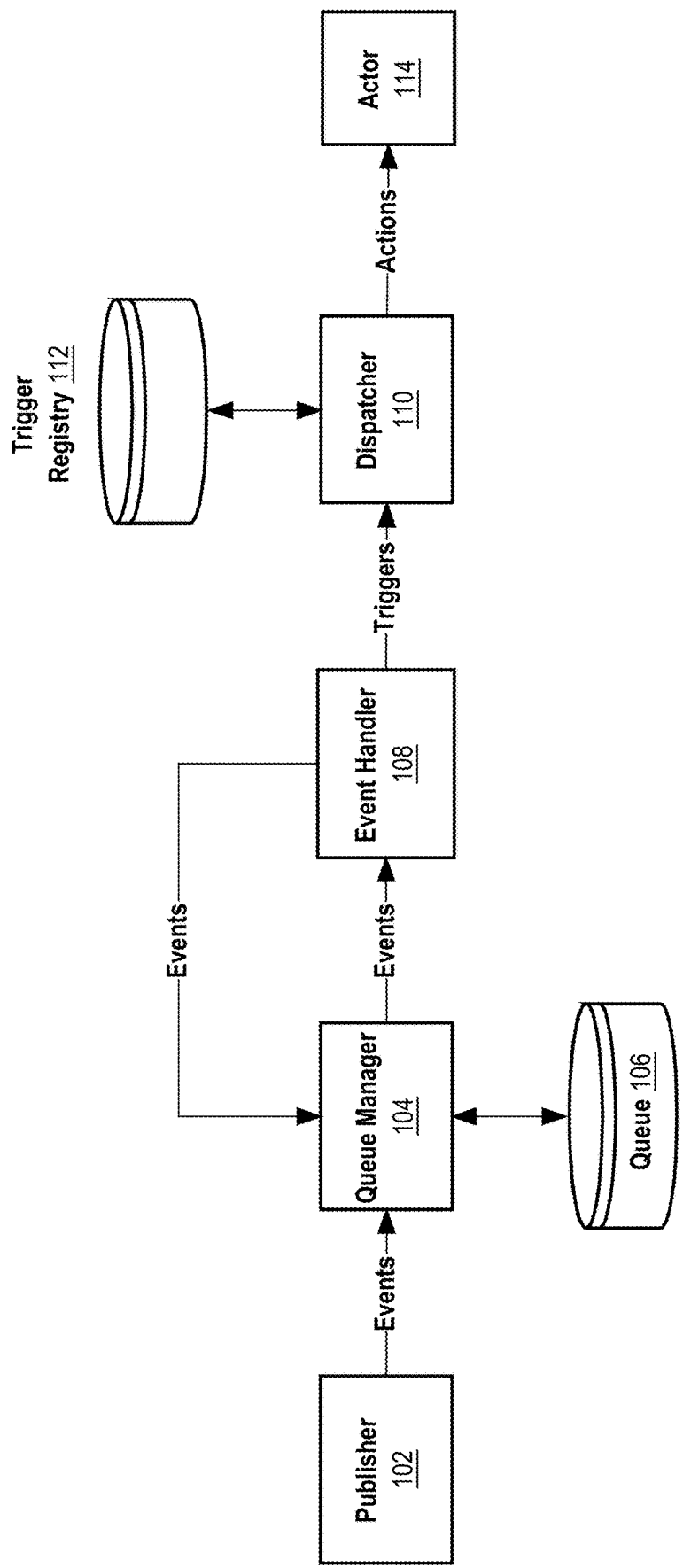
FIG. 1 is a schematic diagram of the real-time trigger, according to some embodiments.

FIG. 1 is a schematic diagram of an event-based electronic communication system 100 that includes the real-time trigger according to some embodiments. Although System 100 may be embodied in a single computing machine, the components of System 100 are preferably embodied in a distributed computing system comprising multiple interconnected (internetworked) computing machines, for purposes of scalability. For example, System 100 may be used by an operator of a large-scale online service such as an Internet-scale service that serves many users over a large geographic area (city, state, county, or country). However, System 100 may instead be an enterprise-scale service for use within a business an organization or other public or private enterprise.

System 100 includes a Publisher 102, a Queue Manager 104, an Event Handler 108, a Dispatcher 110, and an Actor 114. Each of these components are process-oriented components that execute logic (e.g., software and/or hardware-based logic) implementing respective computer-implemented functionality. System 100 also includes a Queue 106 and a Trigger Registry 112. Queue 106 and Trigger Registry 112 are data storage containers that store respective data in storage media.

Publisher 102 creates Events and interacts with Queue Manager 104 to add (publish) the created Events to Queue 106. An "Event" may be viewed as a message that flows through System 100. Events are published to Queue 106 by Publisher 102 via Queue Manager 104. Events are consumed by Event Handler 108 and result in another Event being added to Queue 106 or result in a Trigger to Dispatcher 110. A "Trigger" may be viewed as a construct for specifying an Action. An "Action" may be viewed as a response to a Trigger. For example, an Action may place a user on a Messaging Track or modifying the state of a user that is already on a Messaging Track. A "Messaging Track" may be viewed as a directed graph where the vertices (nodes) of the graph correspond to Events, outgoing electronic communications, logical conditions, switches, delays, or a sub-Messaging Track. The directed edges of the graph represent paths a user can travel on the Messaging Track from vertices to vertices of the graph. The graph may also be viewed as a state machine where a user's current state on the Messaging Track corresponds to one the nodes and directed edges from that node correspond to possible state transitions from that node.

As used herein, the singular form "user" is intended to include the plural forms as well, unless the context clearly indicates otherwise. Thus, reference to "user" herein may be substituted with "users," "a group of users," or "a team of users" without loss of generality. In some embodiments, each individual user holds a user account with the system. The user account provides a unique identity (e.g., a user id) of the user to the system, which can be used by the system to perform various operations on behalf of the user including those disclosed herein. Access to the user account may be protected by an authentication process that requires the user to present valid authentication credentials for the user account (e.g., a valid username and password combination) in order to interact with the online service under the unique identity. In some embodiments, multiple user accounts may be grouped together as a "team." The team facilitates setting access permissions and system configuration for all member user accounts as a group as opposed to having to set the permissions and configuration separately for each user account.

While only one Publisher is depicted in System 100, there may be multiple Publishers in System 100. For example, different Publishers may be used in System 100 to create and publish Events for different event sources. Thus, System 100 is not limited to one event source or any particular type of event source or set of event sources. Flexibly, Publisher 102 provides separation between an event source or event sources and Queue Manager 104 such that the implementation and configuration of Queue Manager 104 is largely, if not entirely, independent of the number and type of event sources for which Publisher 102 creates and publishes Events to Queue 106 via Queue Manager 104.

Queue Manager 104 and Queue 106 provide an asynchronous event stream of all Events published by Publisher 102. The processing of an Event by System 100 begins when the Event is added to Queue 106. Once processing of an Event by System 100 begins, System 100 is preferably designed to dispatch an Action for the Event to Actor 114 for taking the Action, in real-time. By real-time, it is meant that the length of time between when an Event is added to Queue 106 and when an Action for the Event is dispatched to Actor 114 is below an established implementation-specific threshold. The magnitude of the threshold may vary according to the requirements of the particular implementation at hand including the rate at which Events are added to Queue 106 by publisher 102. To meet real-time guarantees, Queue 106 is preferably partitionable and horizontally scalable such that additional computing machines can be added to a computing machine cluster at which Queue 106 is stored to increase the throughput of Events through Queue 106. According to some embodiments, Queue 106 is implemented as an Apache Kafka "topic" having partitions. More information on Apache Kafka including topics and partitions thereof is available on the Internet at /wiki/Apache_Kafka in the Wikipedia.org domain, the entire contents of which is hereby incorporated by reference. While Apache Kafka is used in some embodiments to provide Queue Manager 104 and Queue 106, Apache Kafka is not required. Other unified, high-throughput, low-latency platforms for handling real-time data feeds may be used.

As used herein, a threshold is a specified value or a specified set of values against which a value for an item under comparison is compared. As used herein, "being above a threshold" means that a value for an item under comparison is above a specified other value, that an item under comparison is among a certain specified number of items with the largest value, or that an item under comparison has a value within a specified top percentage amount. As used herein, "being below a threshold" means that a value for an item under comparison is below a specified other amount, that an item under comparison is among a certain specified number of items with the smallest value, or that an item under comparison has a value within a specified bottom percentage amount. Relative terms, such as "real-time" or "high", when not otherwise defined, can be understood as assigning a value and determining how that value compares to an established threshold.

In some embodiments, there is a dedicated queue (e.g., Queue 106) for a particular type of Event, for isolation. For example, Dispatcher 102 may add all Events of a particular type to a respective queue. For example, Dispatcher 102 may add all Events of a type representing a user over his or her storage quota to a queue dedicated to queuing Events of that type. Dispatcher 102 may add other types of Events to queues dedicated to those other types of Events. By doing so, Event queuing isolation is provided such that queuing the Events of one type does not affect the ability of System 100 to queue and process the Events of another type such as, for example, when a large number of Events of one type are published in a short period of time. Isolating queues by event type also allows System 100 to support different real-time guarantees for different types of events. For example, depending on the particular implementation, it might be important that user over storage quota Events be processed quickly by System 100 and that other types of Events need not be processed as quickly. In this case, having an isolated queue for user over storage quota Events can prevent the queuing of other types of Events from preventing System 100 meeting the real-time guarantee with respect to user over storage quota Events.

While in some embodiments System 100 includes a dedicated queue (e.g., Queue 106) for each different type of Event, a single queue may support multiple types of Events. For example, System 100 may include only a single queue (e.g., Queue 106) for all Events. Alternatively, System 100 may include one or more dedicated queues for important Event types where meeting real-time guarantees is important, and a single "remainder" queue for all other less important types of Events where meeting real-time guarantees is less important.

It should be noted that System 100 does not require that Events be processed from Queue 106 in the same order in which the Events were added to Queue 106. In other words, System 100 does guarantee or assume any processing order of Events added to Queue 106. Consequently, the order of Actions dispatched by Dispatcher 110 may not correspond to the order to which the Events that triggered those Actions were added to Queue 106. However, it may be the case in a given implementation that Actions are dispatched in the same or roughly the same order as the Events that trigger those Actions are added to Queue 106, though there is no requirement that this be the case. Further, the same Event may be added multiple times to Queue 106. For example, an Event may be re-queued on Queue 106 by Publisher 102 if an expected Action has not occurred within a threshold amount of time after the Event was previously added to Queue 106.

Queue Manger 104 is a network service that allows Publisher 102 to publish (add) Events to Queue 106 and Event Handler 108 to consume Events from Queue 106. Event Handler 108 is a handler (processor) of Events consumed from Queue 106. In some cases, Event Handler 108 also function as a published of Events to Queue 106. Event Handler 108 is primarily tasked with consuming an Event from Queue 106 and either transforming the consumed Event to a new Event which the Event handler 108 then publishes to Queue 106 or transforming the consumed Event to a Trigger. Note that Event Handler 108 may also be configured to obtain Events from sources other than Queue 106. For example, Event Handler 108 may offer a remote procedure call (RPC) interface by which another queuing service or an event source can provide an Event to Event Handler 108 for processing.

Dispatcher 110 receives Triggers from Event Handler 108. Upon receiving a Trigger, Dispatcher 110 performs a lookup operation in Trigger Registry 112 for one or more Actions mapped to the Trigger. In some embodiments, Trigger Registry 112 applies a Filter to an Action before dispatching the Action to Actor 114. A "Filter" may be viewed as a condition applied to an Action determined for a Trigger. If the condition is met, Dispatcher 110 dispatches the Action to Actor 114. Otherwise, if the condition is not met, then the Action is not dispatched to Actor 114.

Actor 114 is configured to carry out Actions dispatched to it by Dispatcher 110. Although only one actor is shown in FIG. 1, System 100 may include multiple actors to handle different types of Actions. For example, one actor may handle sending Email Actions, another actor may handle sending push notifications, and yet another actor may handle Actions pertaining to putting a user on a Messaging Track or modifying the state of a user that is already on a Messaging Track. As such, Dispatcher 110 may select an actor (e.g., Actor 114), from among multiple candidate actors, to which to dispatch an Action based on the type of the Action, or otherwise based on which actor is capable of carrying out a given Action.

In some embodiments, an actor (e.g., Actor 114) is responsible for presenting secondary online content a user in conjunction with primary online content when the user requests the primary online content (e.g., using a web browser of a mobile application). The secondary online content may include a message for the user in the form of graphics, text, and/or a link according to an Action. The primary online content may be content that the user intended to obtain from the online service. For example, the primary online content may be a home web page or other web page or content served by the online service that is requested by the user (e.g., by selecting a link to the content). The secondary online content may be presented together along with the user requested primary online content. For example, if the primary online content is a requested web page of the online service, then the secondary online content the include graphics, links, and/or text presented in a model or non-model form on or above the primary content of the web page.

According to some embodiments, if a Trigger maps to multiple Actions in Trigger Registry 112, then Dispatcher 110 may dispatch the multiple Actions to an actor or actors in any order.

According to some embodiments, instead of dispatching an Action for immediate handling by an actor (e.g., Actor 114), Dispatcher 110 schedules the Action for handling by an actor for some time in the future. The scheduling by Dispatcher 110 can be based on a specified time such as a time specified by a user. Alternatively, the user may specify a delay time that applies to the Action. For example, the delay time may be "wait for X Y" where X is a number and Y is a time unit such as minutes, hours, days, weeks, or months. As another example, the delay time may be "Wait until next Z" where Z is a future time unit such as hour or the day or day of the week. As yet another alternative, the user may specify that System 100 determine an optimal time in the future to carry out the Action. In this case, Dispatcher 110 may schedule an Action for handling at a determined optimal future time. One possible technique for determining the optimal future time to carry out an Action uses a multi-arm bandit approach as described in related U.S. patent application Ser. No. 15/793,787, entitled "Delayed Processing for Arm Policy Determination for Content Management System Messaging," filed Oct. 25, 2017, the entire contents of which is hereby incorporated by reference as if fully set forth herein.

Events

Figure 2:
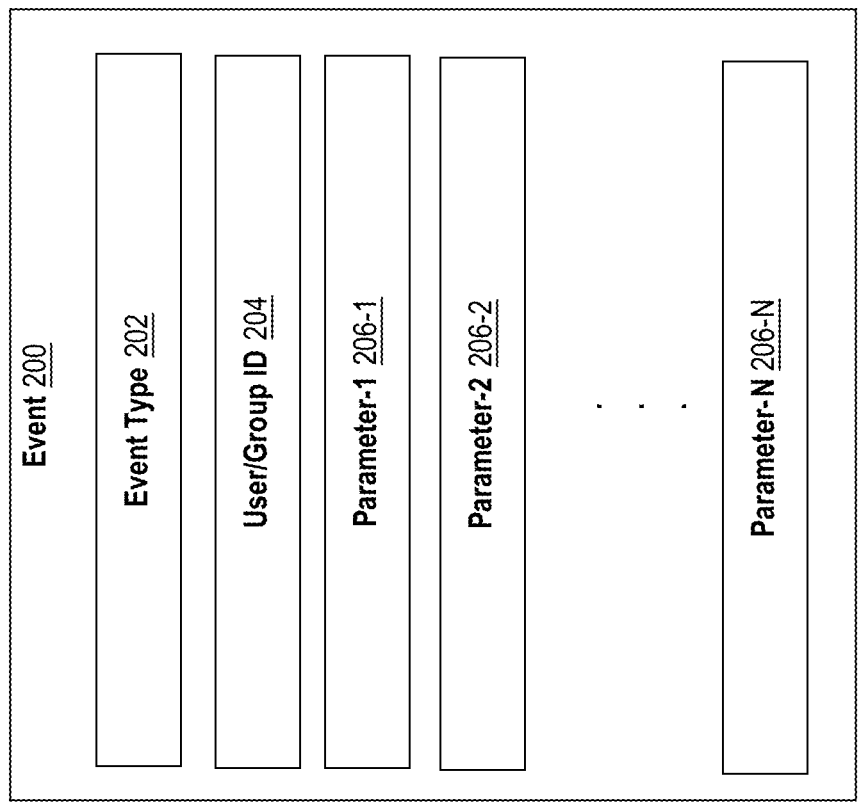
FIG. 2 is a block diagram of an Event, according to some embodiments of the real-time trigger for event-based electronic communication system messaging.

FIG. 2 is a block diagram of an Event 200 according to some embodiments. An Event 200 may be stored in computer storage media or transmitted over a data network in a variety of different data formats and no particular data format is required. According to some embodiments, an Event 200 is serialized for transmission over a data network using Protocol Buffers, JavaScript Object Notation (JSON), or the like. More information on Protocol Buffers is available on the Internet at/wiki/Protocol_Buffers in the wikipedia.org domain, the entire contents of which is hereby incorporated by reference. More information on JSON is available on the Internet at /wiki/JSON in the wikipedia.org domain, the entire contents of which is hereby incorporated by reference. When stored in computer storage media, an Event 200 may be stored in a serialized form (e.g., when stored in non-volatile storage media) or as a high-level programming language object such as, for example, a Java, Python, or C# object (e.g., when stored in volatile storage media).

An Event 200 is a message that flows through System 100. Typically, an Event 200 represents the occurrence of an event caused by user activity or lack of activity with respect to an online or web application service with which the user holds an account. The event may be caused by express user input to the application service such as, for example, retrieving a web page or other user interface of the application, dismissing or navigating away from a web page or other user interface of the application service, clicking on a user interface element of a web page or other user interface of the application service, or opening an Email sent by the application service. The event may also be caused by lack of user activity with the application service such as, for example, when the difference between a current time and a time of a user's last log in to the application service or last use of a particular application service feature is above a threshold. While an event may be caused by user activity or lack thereof with respect to the online service, an event may also be caused by the autonomous operation of the application service. For example, an event may be automatically generated after calculating the amount of hosted storage space that is occupied by a user's hosted content items. The event may reflect that the user's hosted content items as calculated occupy more than a threshold percentage of the user's storage space quota. For example, if the user has a 1 Terabyte (TB) quota, then an event may be generated when it is calculated that the user is using more than 90% of that quota. This is just one example of an event that may be autonomously generated by the online service. There may be many other types of autonomously generated events such as events that reflect the user's usage of the online service.

An Event 200 includes an Event Type 202. An Event Type 202 is a data value (e.g., a string or numeric value) that represents a particular type of the Event 200. An Event Type 202 is typically application-specific. For example, if the application is a content management platform with which users can host their content items (e.g. files), then the Event Type 202 might be "UserNearQuota" or "UserOverQuota." Here, a "UserNearQuota" Event 200 may be generated, for example, when a user is near (between 90% and 100% of) his or her storage space quota with the platform. A "UserOverQuota" Event 200 may be generated, for example, when a user has reached his or her storage space quota. As another example, if the application is a content collaboration platform with which users can collaborate on content items, then an Event Type 202 might be "UserShares" or "UserCommentsOn." Here, a "UserShares" Event 200 may be generated, for example, when a user uses the application to share a content item with another user of the application. A "UserCommentsOn" Event 200 may be generated, for example, when a user comments on a content item using the application. Overall, no particular set of event types are required and the set of possible event types may vary depending on the particular implementation and application at hand. Indeed, a benefit of System 100 is that it is extensible to support an arbitrary set of event types. For this, each distinct type of event should have an Event Type 202 that uniquely identifies the type of event among a set of event types supported by System 100.

An Event 200 may also include a User Identifier 204 or a Group Identifier 204. If a User Identifier 204, User Identifier 204 identifies a user that caused the event, or a user to which the event pertains. If a Group Identifier 204, Group Identifier 204 identifies a group or team of users that caused the event, or a group or team of users to which the event pertains. Examples provided herein that refer to a User Identifier 204 may be substituted with a Group Identifier 204 without loss of generality.

An Event 200 may also include one or more Event Parameters 206 of the event. Each Event Parameter 206 is a data value (e.g., a string or numeric value). An Event Parameter 206 may be specific to the Event Type 202 of the Event 200. For example, for an Event Type 202 representing a web page view, an Event Parameter 206 of the Event 202 may include the path, query, and fragment portions of a Uniform Resource Locator (URL) corresponding to the web page. More information on URLs is available on the Internet at/wiki/URL in the wikipedia.org domain, the entire contents of which is hereby incorporated by reference. As another example, if the Event Type 202 of an Event 200 is "UserNearQuota," then an Event Parameter 206 of the Event 200 may specify the percentage amount of the storage quota that is consumed by the user (group) identified by User Identifier 204 (Group Identifier 204).

Triggers

Figure 3:
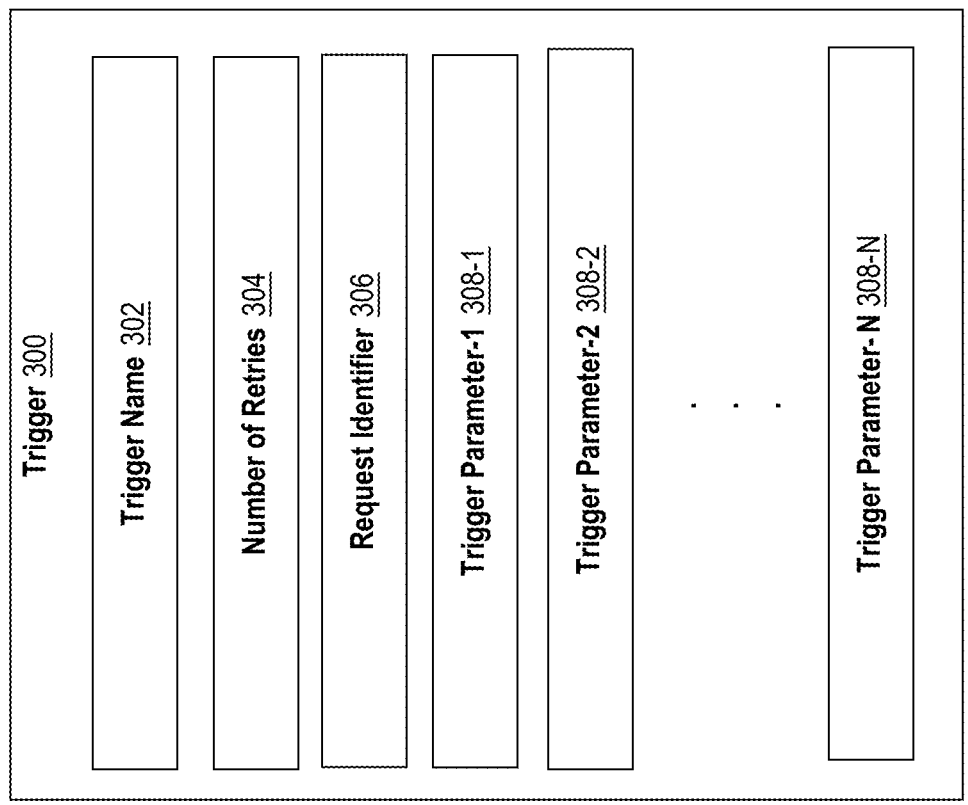
FIG. 3 is a block diagram of a Trigger, according to some embodiments of the real-time trigger for event-based electronic communication system messaging.

FIG. 3 is a block diagram of a Trigger 300 according to some embodiments. A Trigger allows System 100 to decouple Action triggering from Events. When Event Handler 108 obtains an Event, it may transform the Event to a Trigger 300 which is then mapped by Dispatcher 110 to one or more Actions as specified in Trigger Registry 112. Thus, Trigger Registry 112 may be maintained in terms of Triggers and Actions, as opposed to Events and Actions. This is useful for extensibility so that new types of Events may be introduced to System 100, existing types of Events removed from System 100, or the format of Events or certain types of Events changed without necessarily having to modify or update the mapping of Triggers to Actions in Trigger Registry 112.

Like an Event 200, a Trigger 300 may be stored in computer storage media or transmitted over a data network in a variety of different data formats and no particular data format is required. According to some embodiments, a Trigger 300 is serialized for transmission over a data network using Protocol Buffers, JavaScript Object Notation (JSON), or the like. When stored in computer storage media, a Trigger 300 may be stored in a serialized form (e.g., when stored in non-volatile storage media) or as a high-level programming language object such as, for example, a Java, Python, or C# object (e.g., when stored in volatile storage media).

A Trigger 300 may include a Trigger Name 302, a Number of Retries 304, a Request Identifier 306, and one or more Trigger Parameters 308. The Trigger Name 302 is a data value (e.g., string or numeric value) that specifies the unique name of the Trigger 300, unique at least among all trigger names supported by System 100. The Trigger Name 302 may be based on the Event Type 202 of a "source" Event 200 that is transformed to a "target" Trigger 300. In some embodiments, each Event Type 202 supported by System 100 has a corresponding Trigger Name 302. However, it also possible for multiple event types to be transformed to the same Trigger Name 302.

The Number of Retries 304 is an incrementing counter that tracks the number of unsuccessful attempts by Dispatcher 110 to dispatch the Action(s) mapped to the Trigger 300 in Trigger Registry 112. In some embodiments, Dispatcher 110 stops attempting to dispatch the Action(s) for a Trigger 300 if the Number of Retries 304 is above a threshold, to avoid consuming further computing resources unsuccessfully dispatching the Action(s).

The Request Identifier 306 may uniquely identify the Trigger 300 for the purpose of tracking the progress of Trigger 300.

The Trigger Parameters 308 may include the Event Parameter(s) 206 of one or more Events 200 that are transformed into the Trigger 300. Typically, one of the Trigger Parameters 308 is the User Identifier 204 or the Group Identifier 204 of an Event 200 that is transformed into the Trigger 300.

Trigger Registry Data Model

Figure 4:
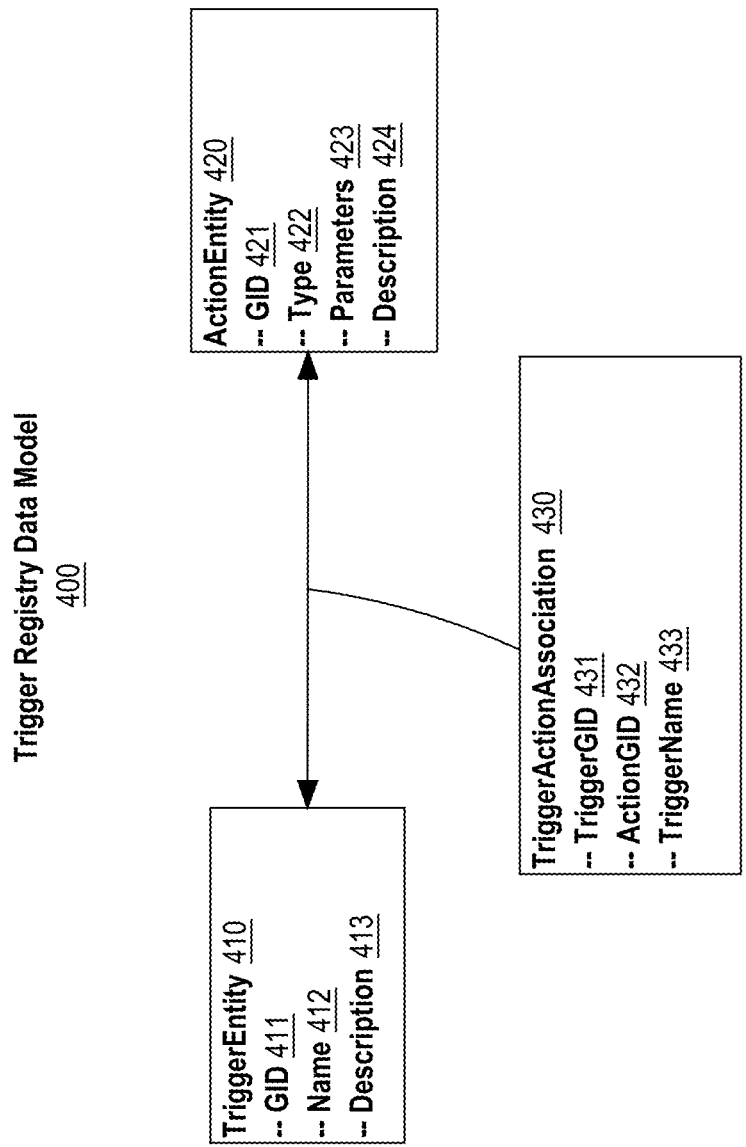
FIG. 4 is a diagram of a data model for a Trigger Registry, according to some embodiments of the real-time trigger for event-based electronic communication system messaging.

FIG. 4 is a diagram of a data model 400 for Trigger Registry 112, according to some embodiments. According to data model 400, Trigger Registry 112 stores Trigger Entities 410, Action Entities 420, and Trigger-Action Associations 430. Each Trigger-Action Association 430 maps one Trigger Entity 410 to one Action Entity 420. Multiple Trigger-Action Associations 430 for the same Trigger Entity 410 may be stored to maps a Trigger to multiple Actions.

A Trigger Entity 410 may include a unique primary key (GID) 411, a name 412, and a description 413. An Action Entity 420 may include a unique primary key (GID) 421, a type 422, parameters 423, and description 424. A Trigger-Action Association 430 may include a combination of a Trigger Entity GID 431 and an Action Entity GID 432. A Trigger-Action Association 430 may also include a Trigger Name 433. The type 422 is a data value that specifies the type of the Action represented by the Action Entity 420. Dispatcher 110 may select an Actor to which to dispatch an Action based on the type 422 of the Action Entity 420 representing the Action.

In some embodiments, System 100 supports Actions that include sending an Email to a user, sending a push notification to a user, starting a user on a Messaging Track, and modifying the state of a user already on a Messaging Track. In these embodiments, there may be at least three Actors: one to send Email, one to send push notifications, and one to manage Messaging Tracks. The type 422 of an Action Entity 420 representing an Action may indicate one of those three Actors to which to dispatch the Action. The parameters 423 are one or more data values used by an Actor to carry out the Action represented by the Action Entity 420. For example, the parameters 423 may include a user or group identifier and other information used to carry out the Action such, for example, an identifier of the Email message or push notification to send, an identifier of a Messaging Track, or an identifier of a node (vertex) on a Messaging Track. The description 424 is a data value (e.g., string value) describing the Action represented by the Action Entity 420.

In some embodiments, System 100 supports Actions that include those discussed above and including starting a user on a "Prompt Campaign." In this case, there may be an Actor for managing Prompt Campaigns. TBD.

Given a Trigger 300, Dispatcher 110 may look up in Trigger Registry 112 all Actions mapped to the Trigger 300 by querying for all Trigger-Action Associations 430 having a Trigger Name 433 matching the Trigger Name 302 of the given Trigger 300. The Actions mapped to the Trigger 300 correspond to the Action Entities 420 in the Trigger Registry 112 having a GID 421 that matches an Action GID 432 of a matching Trigger-Action Association 430. Alternatively, Dispatcher 110 may look up in Trigger Registry 112 the Trigger Entity 410 having the Trigger Name 412 matching the Trigger Name 302 of the given Trigger 300. The Trigger-Action Associations 430 having a Trigger GID 431 matching the GID 411 of the Trigger Entity 410 identify the Action Entities 420 corresponding to the Actions mapped to the given Trigger 300. For clarity of explanation, an Action or Action Entity that is mapped to a given Trigger 300 is referred to hereinafter as a "target" Action or a "target" Action Entity.

Triggering Messaging Track Actions

While a target Action can trigger sending of an electronic communication (e.g., Email or push notification) to the user that caused an Event or to which an Event pertains, a target Action starts a user on a Messaging Track or modifies the state of a user that is already on a Messaging Track in other embodiments. As explained above, a "Messaging Track" may be viewed as a directed graph where the vertices (nodes) of the graph correspond to Events, outgoing electronic communications, logical conditions, switches, delays, or a sub-Messaging Track. The directed edges of the graph represent paths a user can travel on the Messaging Track from vertices to vertices of the graph. The graph may also be viewed as a state machine where a user's current state on the Messaging Track corresponds to one the nodes and directed edges from that node correspond to possible state transitions from that node. Various different Messaging Tracks may be designed for different messaging campaigns or messaging workflows to optimize the effectiveness in automatically communicating with users electronically.

Figure 5A:
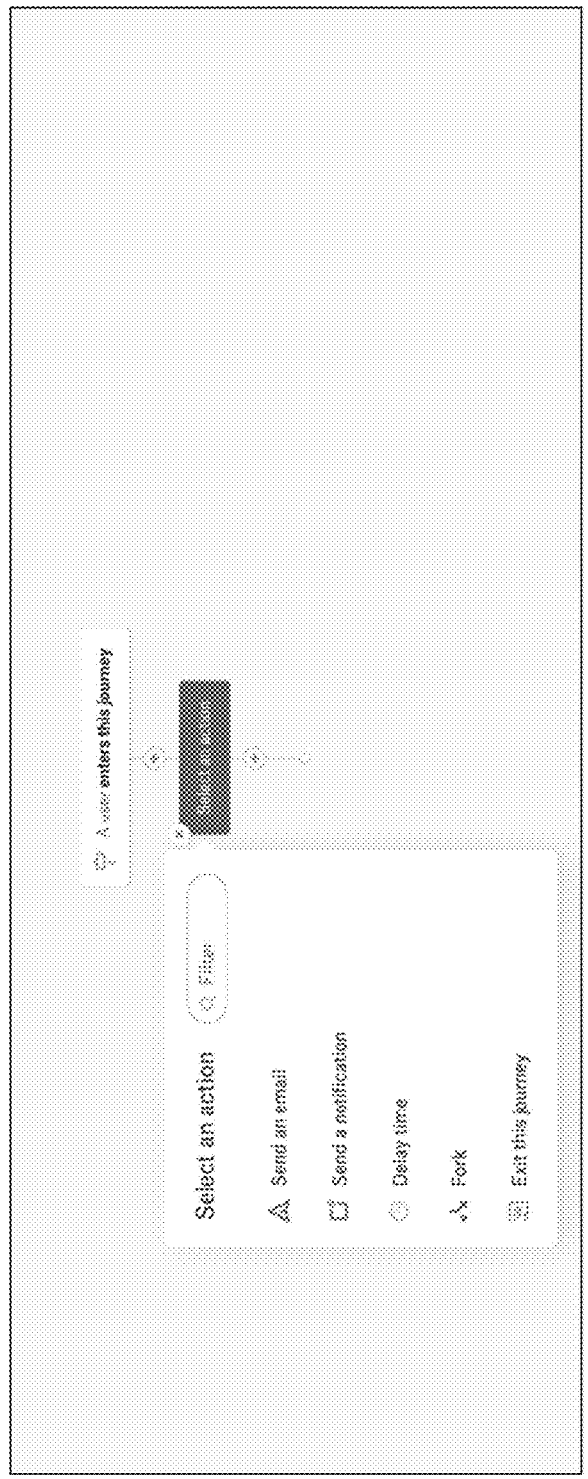
FIG. 5A, FIG. 5B, FIG. 5C depict graphical user interfaces of an application for visually programming a messaging track, according to some embodiments of the real-time trigger for event-based electronic communication system messaging.
Figure 5B:
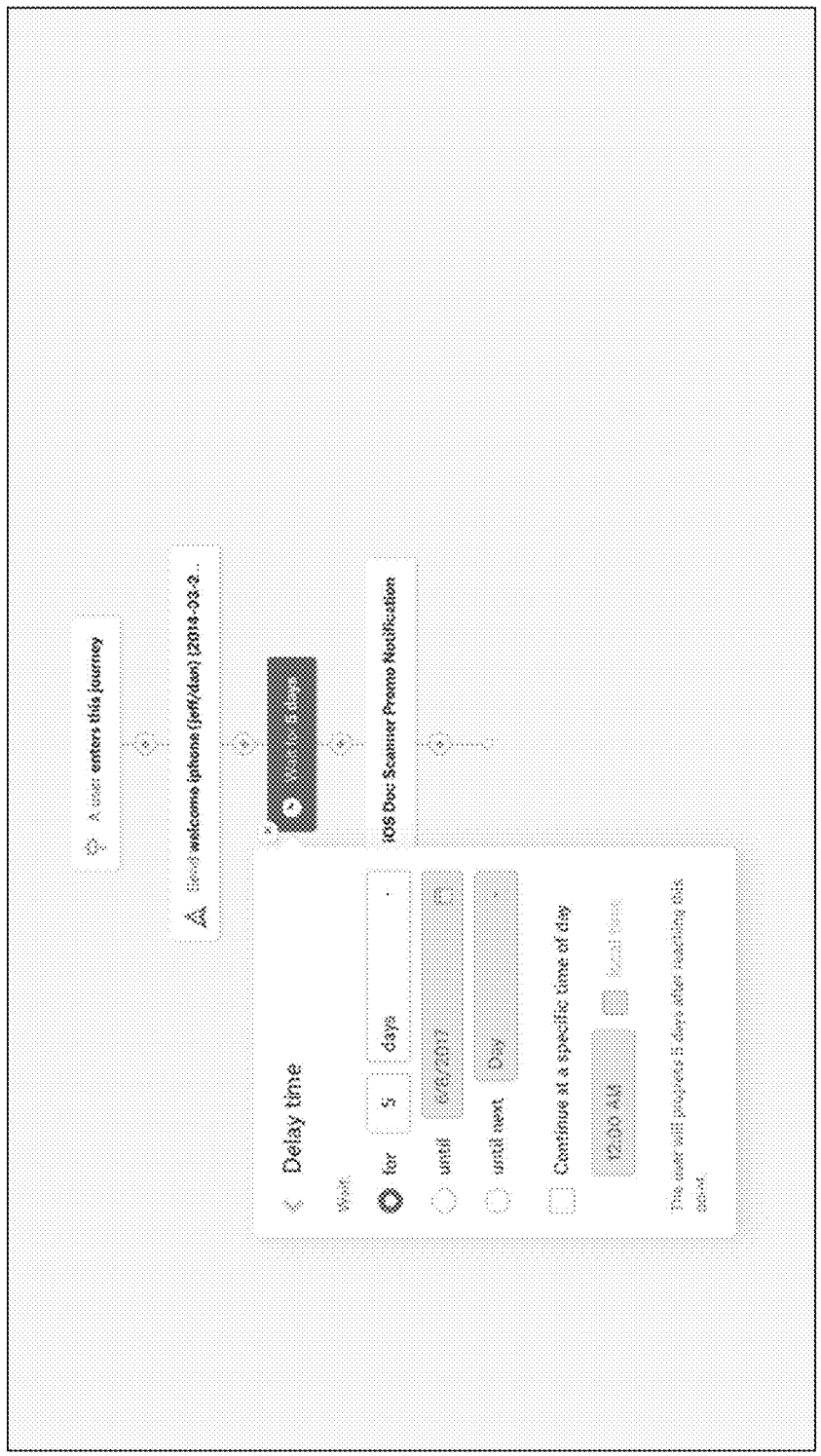
Figure 5C:
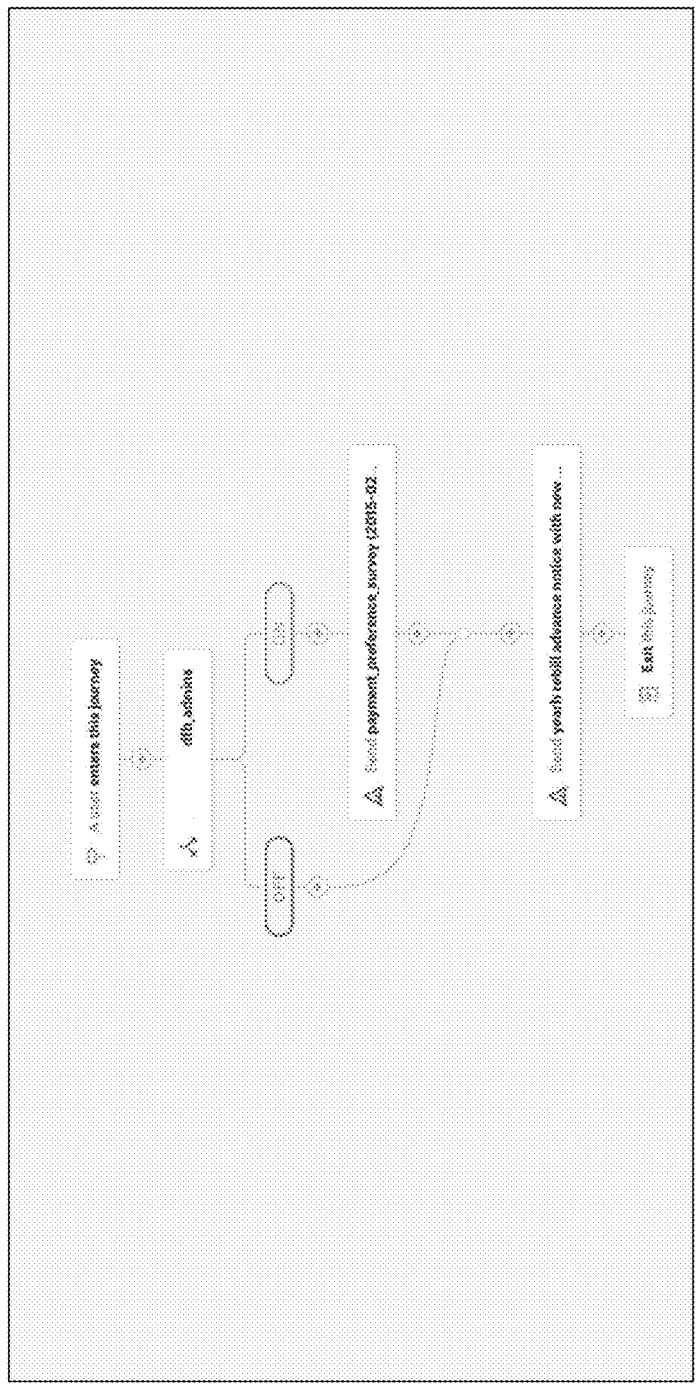

In some embodiments, a Messaging Track is visually programmed by a user. FIGS. 5A, 5B, and 5C provide example graphical user interfaces (GUIs) 500A, 500B, and 500C for a user to visually program a Messaging Track. A Messaging Track is sometimes referred to as a "Journey". GUI 500A includes a representation of a directed graph representing a Messaging Track. As shown in FIG. 5A, the user can use GUI 500A to map a selected action to a particular node (vertex) of the directed graph. In this example, GUI 500A, the user can select a send Email action, a send push notification action, a delay action, or a fork action. In GUI 500B of FIG. 5B, it can be seen that the user has selected a send Email action from the GUI 500A of FIG. 5A and the user has added another node (vertex) that follows the previous node in the Messaging Track. In GUI 500B of FIG. 5B, the user has selected a delay action for the new node. In particular, after the welcome Email message is sent to the user in accordance with the previous node on the Messaging Track, the user will be delayed on the Messaging Track for 5 days. After the 5 days, the user receives a promotional Email. GUI 500C of FIG. 5C provides an example of programming a fork action. In the example Messaging Track of GUI 500C, initially a determination is made whether the user on the Messaging Track is an administrative user or not. If so, then a payment preference Email is sent to the administrative user. If not, then the user does not receive the payment preference Email. However, all users on the Messaging Track are sent a yearly rebill reminder before they exit the Messaging Track.

According some embodiments, a Messaging Track is associated with an identifier that identifies the directed graph (or a data representation thereof) that represents the Messaging Track. Further, each node (vertex) of the directed graph is associated with an identifier that uniquely identifies the node at least within that directed graph. Given this, the parameters 423 of an Action Entity 420 may specify a Messaging Track identifier or a combination of a Messaging Track identifier and an identifier of a node (vertex) of the directed graph representing that Messaging track. Where just a Messaging Track identifier is specified, then the Action is to start the user on the Messaging Track. Where both a Messaging Track identifier and a node identifier are specified, then the Action is to modify the state of the user already on the Messaging Track to transition to the state corresponding to the identified node. In the case where the Action is to start the user on the Messaging Track and the user is already on the Messaging Track, then the Action can be ignored by the Actor. In the case where the Action is to modify the state of the user already on the Messaging Track and the user's current state on the Messaging Track is not at the target node, then the Action can be ignored. The Action may also be ignored in this case if the user is not already on the Messaging Track and the target node is not the initial (start) node on the Messaging Track.

According to some embodiments, a user can visually program a Messaging Track to include one or more "Real-Time Trigger" Nodes, or "RTT Nodes." In general, an RTT Node allows a user to visually program a Messaging Track to cover the scenario: if event X occurs for user U, then either start user U on Messaging Track M or transition the state of User U already on Messaging Track M.

For example, consider the type of Event in a content collaboration system where a user shares a document with another user in the same Email domain. To enable this in System 100, a Trigger Entity 410 for the type of the Event may be stored in Trigger Registry 112. The name 412 of the Trigger Entity 410 may indicate the type of the Event. In addition, an Action Entity 420 is stored in Trigger Registry 112. One of the parameters 423 of the Action Entity 420 may include an identifier of the Messaging Track on which to the place the user. The type 422 of the Action Entity 420 may indicate that the Action is to be carried out by a Messaging Track Actor. A Trigger-Action Association 430 is also stored in Trigger Registry 112. When the Event occurs for a user, System 100 transforms the Event to a Trigger and dispatches the Action to the Messaging Track Actor based on the information stored in Trigger Registry 420. The Messaging Track Actor determines if the user is already on the Messaging Track specified in the dispatched Action. If not, then the Messaging Track Actor starts the user on the specified Messaging Track. The Messaging Track Actor may ignore the dispatched Action if the user is already on the specified Messaging Track. For this determination, the Messaging Track Actor may maintain current state information that tracks which users are currently on which Messaging Tracks. In addition, for each Messaging Track that a user is on, the current state information may specify which node of the directed graph representing the Messaging Track is the user's current node (state). When the Messaging Track actor receives an Action for a user, it may consult the current state information for the user to determine whether the Action should be carried out or ignored.

Figure 6:
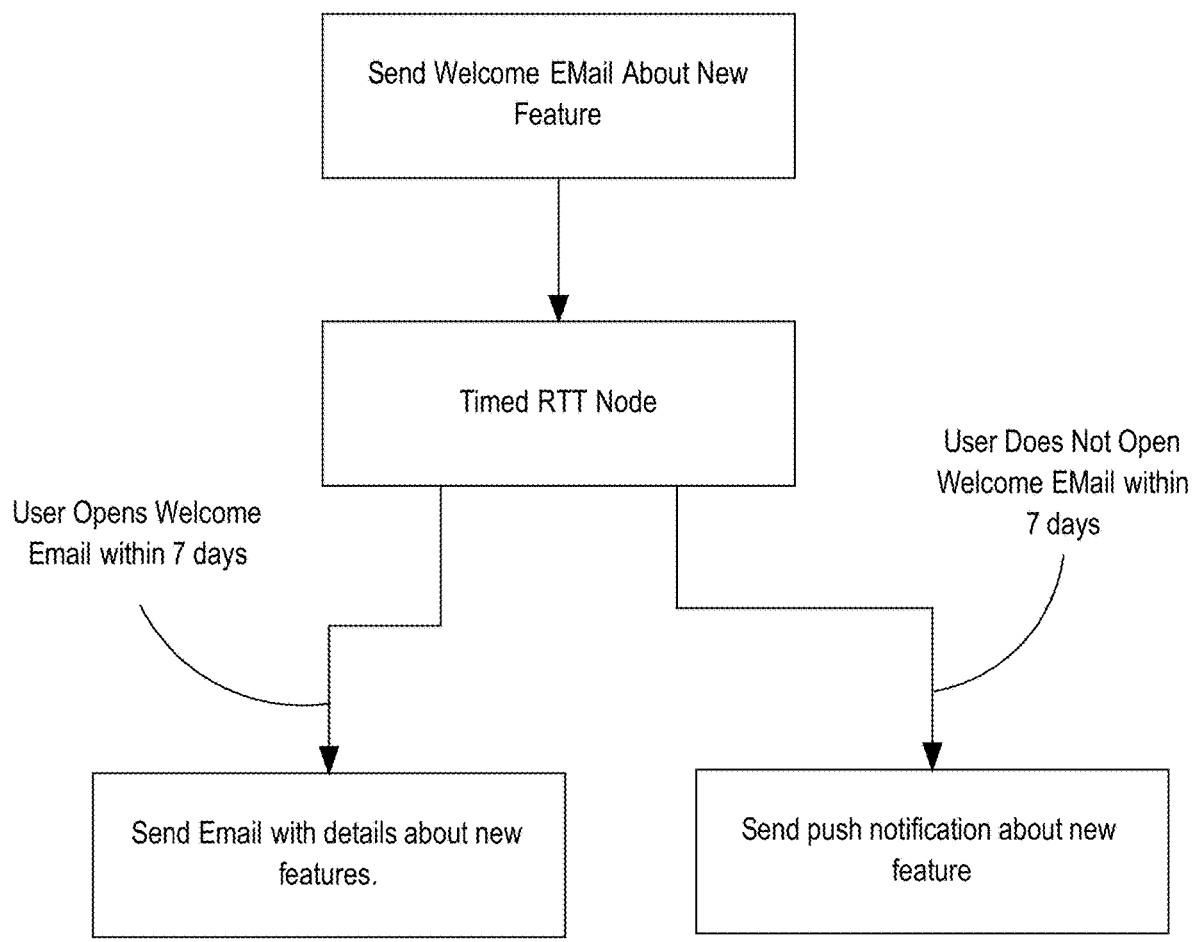
FIG. 6 is a representation of a directed graph of an example messaging track, according to some embodiments of the real-time trigger for event-based electronic communication system messaging.

System 100 may also be used to trigger a fork on a Messaging Track. Consider a user that is already on a new feature release Messaging Track and has already received a welcome Email announcing the new feature. A "timed" RTT Node may be used to put a user on one branch of the Messaging Track if an Event occurs within a certain period of time, and put the user on another branch of the Messaging Track if the Event does not occur within the period of time. For example, FIG. 6 is a representation of a directed graph of a particular Messaging Track. When a user is initially put on the Messaging Track, the user is sent a welcome Email message announcing a new feature of an application. Then, the user's state on the Messaging Track transitions to a timed RTT Node. The timed RTT node is configured to transition the user to one of two states depending on whether the user opens the welcome Email message within seven days of it being sent to the user. If the user does open the welcome Email within seven days, then the user is transitioned to a state where the user is sent an additional Email with more details about the new feature. Otherwise, if the user does not open the welcome Email within seven days, then the user is transitioned to a state where the user is sent a push notification about the new feature. System 100 may be used to trigger the transition a user on the Messaging Track from the Timed RTT node state to the send additional Email state upon occurrence of an Event caused by the user opening the welcome Email.

Basic Computing Machine

Figure 7:
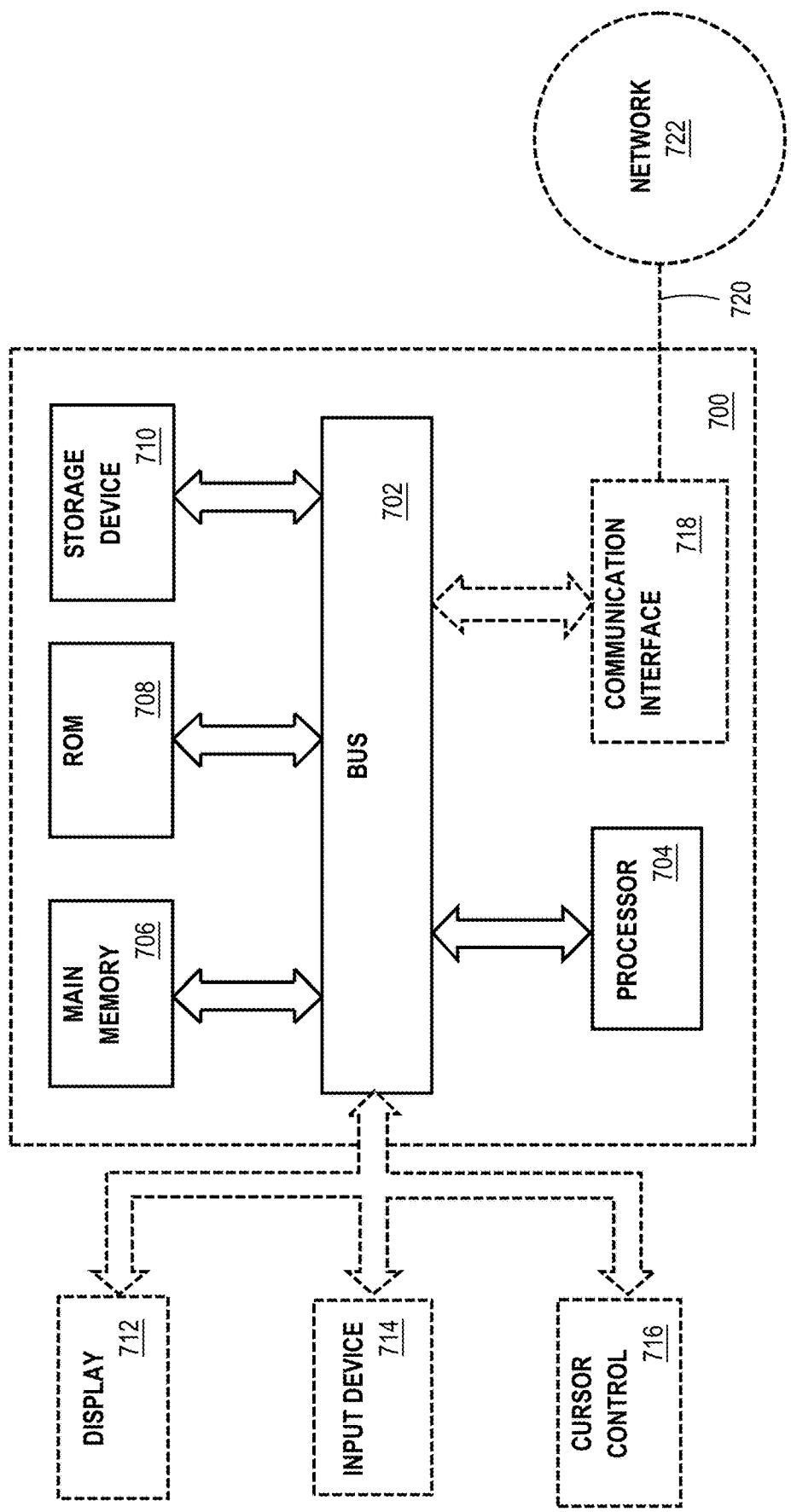
FIG. 7 is a block diagram of a basic computing machine used in some embodiments of the real-time trigger for event-based electronic communication system messaging.

Some embodiments of the real-time trigger for event-based electronic communication system messaging are implemented using a computing system comprising one or more processors and storage media. The one or more processors and storage media may be provided by one or more basic computing machines. FIG. 7 is a block diagram of a basic computing machine 700 that may be used in some embodiments of the real-time trigger for event-based electronic communication system messaging.

Basic computing machine 700 and its hardware components, including their connections, relationships, and functions, is meant to be exemplary only, and not meant to limit implementations of the real-time trigger for event-based electronic communication system messaging. Other computing machines suitable for implementing the real-time trigger for event-based electronic communication system messaging may have different components, including components with different connections, relationships, and functions.

Basic computing machine 700 includes a bus 702 or other communication mechanism for addressing a main memory 706 and for transferring data between and among the various components of basic computing machine 700.

Basic computing machine 700 also includes a processor 704 coupled with bus 702 for processing information. Processor 704 may be a general-purpose microprocessor, a core, a system on a chip (SoC), or another hardware processor or other hardware processing unit.

Main memory 706, such as a random-access memory (RAM) or other dynamic storage device, is coupled to bus 702 for storing information and software instructions to be executed by processor 704. Main memory 706 also may be used for storing temporary variables or other intermediate information during execution of instructions to be executed by processor 704.

Instructions, when stored in storage media accessible to processor 704, render basic computing machine 700 into a special-purpose computing machine that is customized to perform the operations specified in the instructions. The terms "software", "software instructions", "computer program", "computer-executable instructions", "processor-executable instructions," or other "instructions" that are configured for execution by a processor (e.g., 704) are to be broadly construed to cover any machine-readable information, whether or not human-readable, for instructing a computing machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Basic computing machine 700 includes a read-only memory (ROM) 708 or other static storage device coupled to bus 702 for storing static information and software instructions for a processor 704.

A mass storage device 710 is coupled to bus 702 for persistently storing information and instructions on fixed or removable media, such as magnetic, optical, solid-state, magnetic-optical, flash memory, or any other available mass storage technology. The mass storage may be shared on a network, or it may be dedicated mass storage. Mass storage device 710 may store a body of program and data for directing operation of basic computing machine 700, including an operating system, user application programs, driver, and other support files, as well as other data files of all sorts.

Basic computing machine 700 may be coupled via bus 702 to a display 712, such as a liquid crystal display (LCD) or other electronic visual display, for displaying information to a computer user. A touch sensitive surface incorporating touch detection technology (e.g., resistive, capacitive, etc.) may be incorporated with display 712 to form a touch sensitive display for communicating touch gesture (e.g., finger or stylus) input to processor 704.

An input device 714 may be coupled to bus 702 for communicating information and command selections to processor 704. Input device 714 may include alphanumeric and other keys. Input device 714 may include one or more physical buttons or switches such as, for example, a power (on/off) button, a "home" button, volume control buttons, or the like.

A cursor control 716, such as a mouse, a trackball, touchpad, touch-sensitive surface, or cursor direction key for communicating direction information and command selections to processor 704 and for controlling cursor movement on display 712, may be coupled to bus 702. Cursor control 716 may have two degrees of freedom in two axes, a first axis (e.g., x) and a second axis (e.g., y), that allows the device to specify positions in a plane. Cursor control 716 may have more degrees of freedom with a third axis (e.g., z). For example, cursor control 716 may have three translational degrees of freedom (e.g., surge, heave, and sway) in three perpendicular axes, that allows specification of position in the three axes. Cursor control 716 may have three rotational degrees of freedom (e.g., pitch, yaw, roll) about three perpendicular axes, that allows specification of an orientation about the three axes.

While one or more of display 712, input device 714, and cursor control 716 may be external components (e.g., peripheral devices) of basic computing machine 700, some or all of display 712, input device 714, and cursor control 716 may be integrated as part of the form factor of basic computing machine 700.

A function or operation of the present invention may be performed by basic computing machine 700 in response to processor 704 executing one or more computer programs of instructions contained in main memory 706. Such instructions may be read into main memory 706 from another storage medium, such as a storage device 710. Execution of the instructions contained in main memory 706 cause processor 704 to perform the function or operation.

While a function or operation of the real-time trigger for event-based electronic communication system messaging may be implemented entirely with computer program instructions, hard-wired or programmable circuitry of basic computing machine 700 (e.g., an ASIC, a FPGA, or the like) may be used in place of or in combination with computer program instructions to perform the function or operation.

The term "storage media" as used herein refers to any non-transitory media that store data and/or software instructions that cause a computing machine to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a data communications network. Basic computing machine 700 can receive the data over the data communications network and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Basic computing machine 700 may include a communication interface 718 coupled to bus 702. Communication interface 718 provides a two-way data communication coupling to a wired or wireless network link 720 that connects basic computing machine 700 to a data communications network 722 (e.g., a local area network (LAN), a wide area network (WAN), a wireless local area network (WLAN), a metropolitan area network (MAN), a storage area network (SAN), etc.). Network link 720 provides data communication through network 722 to one or more other networked devices.

Communication interface 718 may send and receive electrical, electromagnetic, or optical signals that carry digital data streams representing various types of information. For example, communication interface 718 may be implemented by a wired network interface card, a wireless network interface card with an integrated radio antenna, or a modem.

Network link 720 may provide a connection through network 722 to a host computer or to data equipment operated by an Internet Service Provider (ISP). The ISP may in turn provide data communication services through the world-wide packet data communication network now commonly referred to as the "Internet". Network 722 and Internet use electrical, electromagnetic or optical signals that carry digital data streams. The signals through the various networks and the signals on network link 720 and through communication interface 718, which carry the digital data to and from basic computing machine 700, are example forms of transmission media.

Basic computing machine 700 can send messages and receive data, including program code, through network 722, network link 720, and communication interface 718. In the Internet example, a server might transmit a requested code for an application program through Internet, ISP, and network 722 and communication interface 718.

The received code may be executed by processor 704 as it is received, and/or stored in storage device 710, or other non-volatile storage for later execution.

Basic Software System

Figure 8:
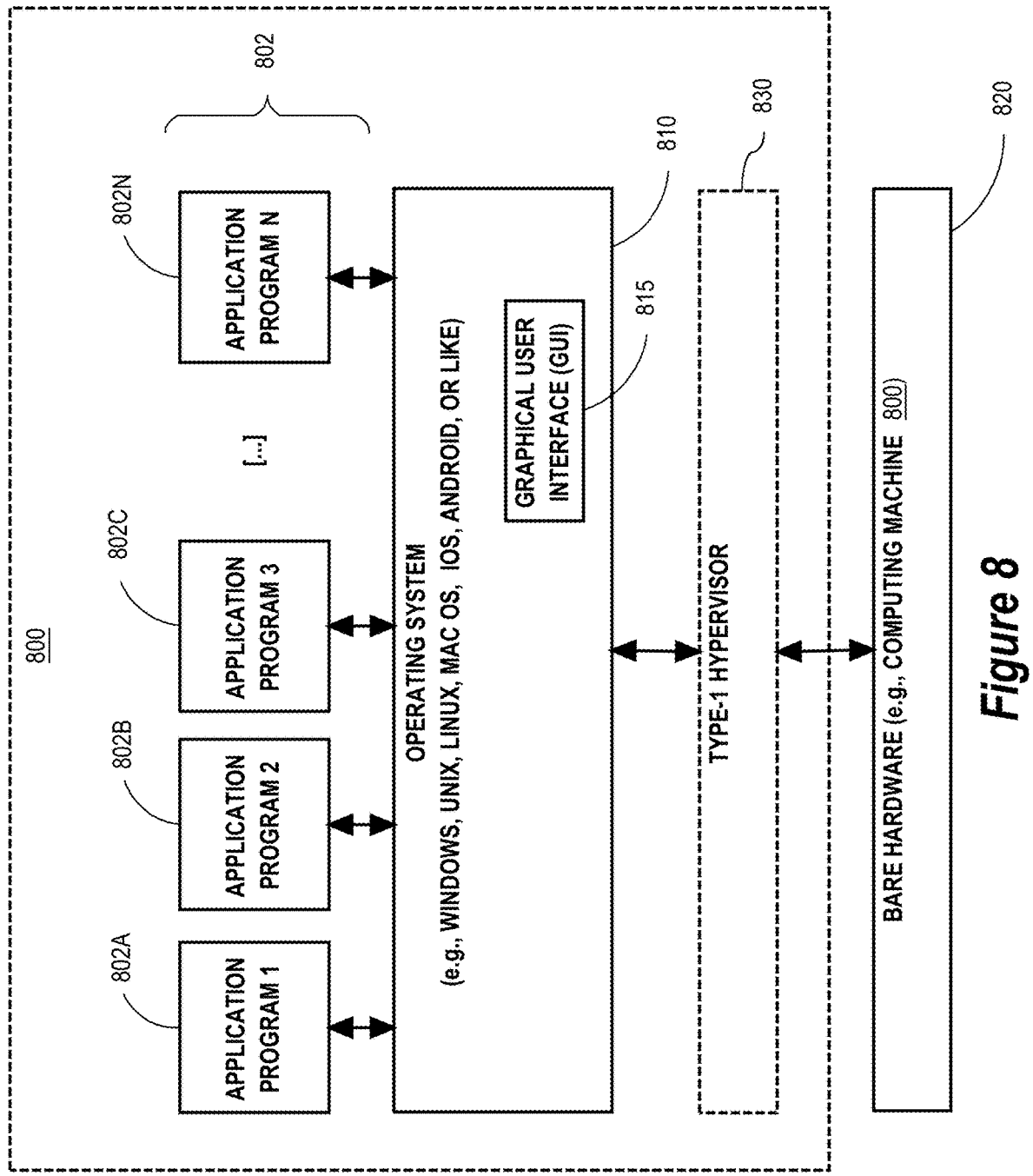
FIG. 8 is a block diagram of a basic software system for controlling the operation of the basic computing machine.

FIG. 8 illustrates a basic software system 800 that may be employed for controlling the operation of basic hardware machine 700 of FIG. 7. Software system 800 and its software components, including their connections, relationships, and functions, is meant to be exemplary only, and not meant to limit implementations of the present invention. Other software systems suitable for implementing the present invention may have different components, including components with different connections, relationships, and functions.

Software system 800 is provided for directing the operation of hardware machine 700. Software system 800 may be stored in system memory (RAM) 706 and on fixed storage (e.g., hard disk or flash memory) 710.

Software system 800 includes a kernel or operating system (OS) 810. OS 810 manages low-level aspects of computer operation, including managing execution of processes, memory allocation, file input and output (I/O), and device I/O.

Software system 800 includes one or more application programs, represented as 802A, 802B, 802C . . . 802N, that may be "loaded" (e.g., transferred from fixed storage 710 into memory 706) for execution by hardware machine 700. The applications or other software intended for use on hardware machine 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. GUI 815 also serves to display the results of operation from the OS 810 and applications 802, whereupon the user may supply additional inputs or terminate the session (e.g., log off).

Software system 800 can execute directly on bare hardware 820 (e.g., machine 700). Alternatively, a "Type-1" hypervisor 830 may be interposed between the bare hardware 720 and OS 710 as part of software system 800. Hypervisor 830 acts as a software "cushion" or virtualization layer between the OS 810 and bare hardware 820. Hypervisor 830 instantiates and runs one or more virtual machine instances. Each virtual machine instance comprises a "guest" operating system, such as OS 810, and one or more applications, such as applications 802, designed to execute on the guest operating system. Hypervisor 830 presents the guest operating systems with a virtual operating platform and manages the execution of the guest operating systems. Hypervisor 830 may manage low-level aspects of computer operation in addition to or instead of OS 810.

Hypervisor 830 may allow a guest operating system to run as if it is running on bare hardware 820 directly. In this case, the guest operating system as configured to execute on bare hardware 820 can also execute on hypervisor 830. In other words, hypervisor 830 may provide full hardware virtualization to the guest operating system. Alternatively, hypervisor 830 may provide para-virtualization to the guest operating system. In this case, the guest operating system is "aware" that it executes on hypervisor 830 and is specially designed or configured to execute on hypervisor 830.

EXTENSIONS AND ALTERNATIVES

In the foregoing specification, some embodiments of the real-time trigger for event-based electronic communication system messaging have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method performed by a computing system comprising one or more processors and storage media storing one or more programs, the one or more programs comprising instructions executed by the one or more processors to perform the method, the method comprising:

queuing an event pertaining to one or more user accounts of an online service;

dequeuing the event and transforming the dequeued event to a trigger, the trigger having a name corresponding to a type of the event;

mapping the trigger to an action, the mapping based on the name of the trigger; and dispatching the action for the one or more user accounts to an actor configured to carry out the action;

wherein:

the action comprises an identifier of a messaging track, the messaging track represented by a directed graph having nodes and one or more edges between the nodes; and the actor carries out the action including placing each user account of the one or more user accounts on the messaging track by associating each user account of the one or more user accounts with a node of the nodes.

2. The method of claim 1, wherein the action is associated with an action type; and wherein the method further comprises selecting the actor to which to dispatch the action, from among a plurality of candidate actors, based on the action type.

3. The method of claim 1, wherein:

the event comprises an identifier of the one or more user accounts;

the trigger comprises the identifier of the one or more user accounts; and the action dispatched to the actor comprises the identifier of the one or more user accounts.

4. The method of claim 1, wherein the event is queued on a particular queue of a plurality of queues; and wherein the method further comprises selecting the particular queue to queue the event based on the type of the event.

5. The method of claim 1, wherein each user account of the one or more user accounts is associated with a respective Email address; wherein the actor carries out the action; and wherein carrying out the action includes, for each user account of the one or more user accounts, sending an Email to the respective Email address associated with the user account.

6. The method of claim 1, wherein each user account of the one or more user accounts is associated with a respective computing device; wherein the actor carries out the action; and wherein carrying out the action includes, for each user account of the one or more user accounts, sending a push notification to the respective computing device associated with the user account.

7. One or more non-transitory storage media storing one or more programs configured for execution by a computing system comprising one or more processors and storage media, the one or more programs comprising instructions which, when executed by the computing system, causes the computing system to perform:

queuing an event pertaining to one or more user accounts of an online service;

dequeuing the event and transforming the dequeued event to a trigger, the trigger having a name corresponding to a type of the event;

mapping the trigger to an action, the mapping based on the name of the trigger; and dispatching the action for the one or more user accounts to an actor configured to carry out the action;

wherein:

the action comprises an identifier of a messaging track and an identifier of a first node of the messaging track; and the actor carries out the action including determining, for each user account of the one or more user accounts, if the user account's current state on the messaging track is at the first node, and if the user account's current state on the messaging track is at the first node, then transitioning the user account on the messaging track to a second node of the nodes.

8. The one or more non-transitory storage media of claim 7, wherein the action is associated with an action type; and wherein the one or more programs comprise instructions which, when executed by the computing system, cause the computing system to perform selecting the actor to which to dispatch the action, from among a plurality of candidate actors, based on the action type.

9. The one or more non-transitory storage media of claim 7, wherein:

the event comprises an identifier of the one or more user accounts;

the trigger comprises the identifier of the one or more user accounts; and the action dispatched to the actor comprises the identifier of the one or more user accounts.

10. The one or more non-transitory storage media of claim 7, wherein the event is queued on a particular queue of a plurality of queues; and wherein the one or more programs comprise instructions which, when executed by the computing system, cause the computing system to perform selecting the particular queue to queue the event based on the type of the event.

11. The one or more non-transitory storage media of claim 7, wherein each user account of the one or more user accounts is associated with a respective Email address; wherein the actor carries out the action; and wherein carrying out the action includes, for each user account of the one or more user accounts, sending an Email to the respective Email address associated with the user account.

12. The one or more non-transitory storage media of claim 7, wherein each user account of the one or more user accounts is associated with a respective computing device; wherein the actor carries out the action; and wherein carrying out the action includes, for each user account of the one or more user accounts, sending a push notification to the respective computing device associated with the user account.

13. A computing system comprising:

one or more processors;

storage media;

one or more programs stored in the storage media, the one or more programs comprising instructions which, when executed by computing system, cause the computing system to perform:

queuing an event pertaining to one or more user accounts of an online service;

dequeuing the event and transforming the dequeued event to a trigger, the trigger having a name corresponding to a type of the event;

mapping the trigger to an action, the mapping based on the name of the trigger;

dispatching the action for the one or more user accounts to an actor configured to carry out the action;

wherein:

the action comprises an identifier of a messaging track, the messaging track represented by a directed graph having nodes and one or more edges between the nodes; and the actor carries out the action including associating a first user account of the one or more user accounts with a first node of the nodes.

14. The system of claim 13, wherein:

the first user account has a current state on the messaging track;

the action comprises an identifier of the first node of the nodes; and the actor carries out the action including determining if the first user account's current state on the messaging track is at the first node, and if the first user account's current state on the messaging track is at the first node, then transitioning the first user account on the messaging track along an edge of the one or more edges from the first node to a second node of the nodes.

15. The system of claim 13, wherein the action is associated with an action type; and wherein the one or more programs comprise instructions which, when executed by computing system, cause the computing system to perform selecting the actor to which to dispatch the action, from among a plurality of candidate actors, based on the action type.

16. The system of claim 13, wherein the first user account is associated with a computing device; wherein the actor carries out the action; and wherein carrying out the action includes causing secondary online content to be presented at the computing device associated with the first user account in conjunction with presentation of primary online content requested by the computing device associated with the first user account from the online service.

17. The system of claim 13, wherein:

the one or more user accounts is a plurality of user accounts;

the plurality of user accounts includes a second user account;

the second user account has a current state on the messaging track;

the action comprises an identifier of the first node of the nodes; and the actor carries out the action including determining if the second user account's current state on the messaging track is at the first node, and if the second user account's current state on the messaging track is not at the first node, then ignoring the action for the second user account.

18. The system of claim 13, wherein:

the actor carries out the action including determining whether the first user account is already on the messaging track, and if the first user account is not already on the messaging track, then placing the first user account on the messaging track by associating the first user account with the first node.

19. The system of claim 13, wherein:

the one or more user accounts is a plurality of user accounts;

the plurality of user accounts includes a second user account;

the actor carries out the action including determining whether the second user account is already on the messaging track, and if the second user account is already on the messaging track, then ignoring the action for the second user account.

* * * * *